United States Patent [19]
Leistner

[11] Patent Number: 5,863,164
[45] Date of Patent: Jan. 26, 1999

[54] TEE-NUT WITH RADIUSSED BARREL END

[75] Inventor: Volkmar W. Leistner, Toronto, Canada

[73] Assignee: Sigma Tool & Machine, Scarborough, Canada

[21] Appl. No.: 12,215

[22] Filed: Jan. 23, 1998

[51] Int. Cl.[6] .............................. F16B 37/00; F16B 37/04
[52] U.S. Cl. ...................... 411/181; 411/177; 411/183; 411/427
[58] Field of Search ................................... 411/179, 180, 411/181, 173, 177, 113, 183, 427

[56] References Cited

U.S. PATENT DOCUMENTS

| | | | |
|---|---|---|---|
| 3,480,061 | 11/1969 | Leistner | 411/177 |
| 5,348,432 | 9/1994 | Nagayama . | |
| 5,429,466 | 7/1995 | Nagayama | 411/181 X |
| 5,618,144 | 4/1997 | Leistner . | |

FOREIGN PATENT DOCUMENTS 914529  1/1963  United Kingdom .................. 411/177

*Primary Examiner*—Neill Wilson

[57] ABSTRACT

A Tee-nut with flareable portion comprises a flange head, a plurality of prongs extending from the flange head, and a hollow barrel extending from the flange head. The hollow barrel has an internally threaded portion provided at one end of the barrel connecting to the flange head, and an enlarged flareable portion extending from the internally threaded portion and provided at a free end of the barrel. The end of the enlarged flareable portion is radiussed inwardly so as to form an end opening having a diameter which reduced in relation to the diameter of the flareable portion to facilitate insertion into a hole in a workpiece. The present invention further discloses a workpiece fitted with such a Tee-nut.

7 Claims, 2 Drawing Sheets

TEE-NUT WITH RADIUSSED BARREL END

FIELD OF THE INVENTION

The present invention relates to a Tee-nut and, in particular, to a Tee-nut having a radiussed barrel end which is flarable for enhanced retention. The present invention also relates to a method of forming a Tee-nut with a radiussed barrel end.

BACKGROUND OF THE INVENTION

Fastener members, having a flange portion and a hollow barrel portion with a flarable end, are known and are commonly referred as Tee-nuts, or rivet type Tee-nuts. In this specification, the term "Tee-nut" is used to describe such fastener members.

Such Tee-nuts are usually formed of sheet metal, and provide a flange portion with a plurality of fastening teeth or prongs, and a threaded sleeve or barrel, all formed out of a single piece of sheet metal.

Typically such Tee-nuts are used, for example, in furniture frames, for fastening the arms and legs of the furniture to the frame. They also have a variety of other uses, both in furniture and in many other industries.

U.S. Pat. No. 5,348,432 granted to Nagayama on Sep. 20, 1994 discloses a Tee-nut having a sleeve in the form of a hollow cylinder with a relatively thin-walled flarable end portion and a relatively thicker-walled threaded portion. The thin-walled flarable hollow sleeve end is formed by counter boring an internally threaded hollow sleeve. The disadvantage of this product is that counter boring is uneconomical to perform. Also, tiny metal scraps are likely to be left behind within the internal threads. Also, when flared outwardly, the thin-walled flarable counter-bored end has a tendency to split, and the thin walled portion has a tendency to collect wood chips internally in the threads.

U.S. Pat. No. 5,618,144, inventor Volkmar W. Leistner, title Tee-nut with Enlarged Barrel End, granted Apr. 8, 1997 and assigned to Sigma Tool & Machine a Partnership of Sigma Tool & Machine Limited and Sigma Fasteners Limited shows an improved form of Tee-nut with a flarable end. In this patent the Tee-nut barrel is swaged out to enlarge its diameter, without counterboring and weakening the flarable portion. However, these Tee-nuts require to be inserted into and through a bore in a wooden workpiece. The enlarged flarable leading end which was inserted first into the bore tended to cause unnecessary problems, since the leading end of the open bore tended to catch on the wood or tear particles of wood away.

BRIEF SUMMARY OF THE INVENTION

The present invention provides a Tee-nut comprising a flange head member, a plurality of prongs extending from said flange head member, and a sleeve member extending from said flange head member, said sleeve member being in the form of a hollow cylindrical barrel comprising an internally threaded cylindrical portion provided at one end of said sleeve member connecting to said flange head member, and an enlarged cylindrical flarable portion extending from said internally threaded portion and provided at a free end of said sleeve member, wherein the outer diameter of said enlarged cylindrical flarable portion is larger than the outer diameter of said internally threaded portion, and wherein the inner diameter of said enlarged cylindrical flarable portion is larger than the inner diameter of said internally threaded cylindrical portion such that a threading tool is adapted to pass through said enlarged flarable cylindrical portion and operable to internally thread said one end of said sleeve member forming said internally threaded portion and wherein the end of said enlarged cylindrical flarable portion is radiussed inwardly. The inwardly radiussed end on said enlarged cylindrical flareable portion has inward and outer surfaces which are formed around the radius of the end and defining an end opening having a predetermined diameter D3, wherein D3 is less than D2, the diameter of the flareable portion, and is greater than D1, the diameter of the sleeve portion, whereby said threading tool can pass through said end opening and enter said sleeve for internally threading said sleeve as aforesaid, and whereby entry of said enlarged flareable portion into said workpiece is facilitated by said inward radiussing.

The present invention further provides a Tee-nut having an outwardly extending portion connecting between said internally threaded portion and said enlarged flarable portion, said outwardly extending portion being adapted to be flared outwardly when said enlarged flarable portion is being flared out.

The invention is used in holes which are generally oversized relative to the Tee-nut. To centre the Tee-nut there is a trumpet shaped radius between the threaded portion and the flange.

The present invention also provides a method of forming a Tee-nut with an enlarged barrel end, said Tee-nut having a flange head, a plurality of prongs extending from said flange head, and a hollow barrel extending perpendicular to said flange head and having one end connected to said flange head and a free end, the method comprising the steps of enlarging said free end of said barrel by means of a swaging tool, inwardly radiussing the outer enlarged end of said free end of said barrel and thereafter forming threads on the inner surface of said one end of said barrel by means of a threading tool.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
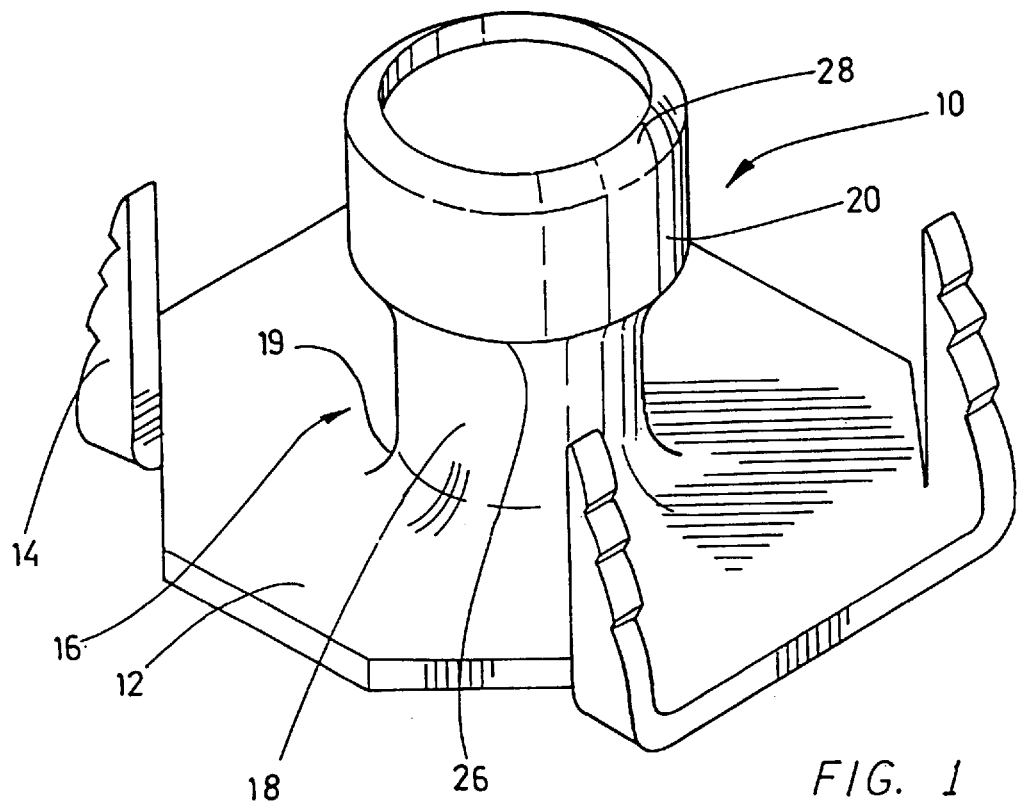
FIG. 1 is a perspective view of a Tee-nut illustrating an embodiment of the present invention.
Figure 2:
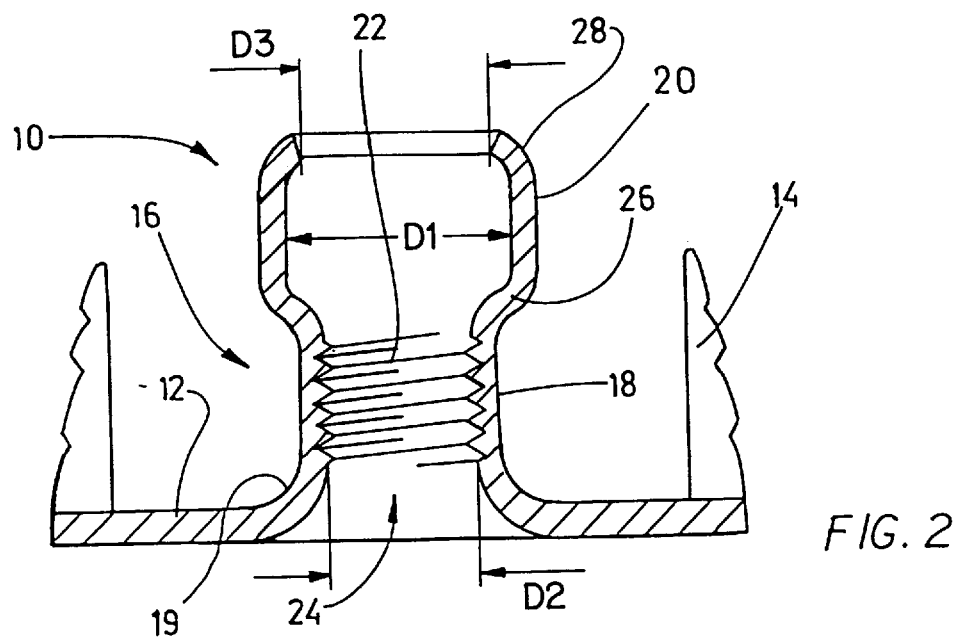
FIG. 2 is a sectional view taken along line 2—2 in FIG. 1.

FIGS. 1 and 2 show a Tee-nut illustrating an embodiment of the present invention.

The Tee-nut, generally indicated by reference numeral 10, comprises an octagon-shaped flange head 12, four integral prongs 14—14 extending from the flange head 12, and an integral hollow sleeve, or barrel 16 extending perpendicular from the flange head 12.

The cylindrical barrel 16 comprises an internal threaded portion 18 and an enlarged portion 20.

Between the portion 18, and flange 12 there is a trumpet-shaped radiussed portion 19 for reasons to be described.

The internal cylindrical threaded portion 18, having internal threads 22, defines an internal aperture or opening 24 having an internal diameter D1 in which a co-operating threaded screw member (not shown) is received.

The enlarged portion 20 is formed by expanding or swaging the free end of the barrel 16 by means of a conventional swaging tool. According to the present embodiment, the enlarged portion 20 is in the form of a hollow cylinder having an internal diameter D2 extending from the internal threaded portion 18. A junction portion 26 connects portion 18 with portion 20.

The outer diameter of the enlarged flarable portion 20 is larger than the outer diameter of said internally threaded portion 18. The inner diameter D2 of the enlarged flarable portion 20 is larger than the inner diameter D2 of the internally threaded portion 18 such that a threading tool is adapted to pass through the enlarged flarable portion 20 and internally threading the barrel 16 forming the internally threaded portion 18.

An inwardly radiussed end portion 28 is formed at the end of the enlarged portion 20. The radiussed portion 28 is formed by turning the outer end of portion 20 inwardly by a suitable tool. Radiussed end portion 28 defines an end opening 28A having an internal diameter D3, wherein D3 is greater than D1 but is less than D2. In this way a threading tool (not shown) can enter opening 28A and pass through flared portion 20 and enter the interior of sleeve 16 and form internal threads therein.

Figure 3:
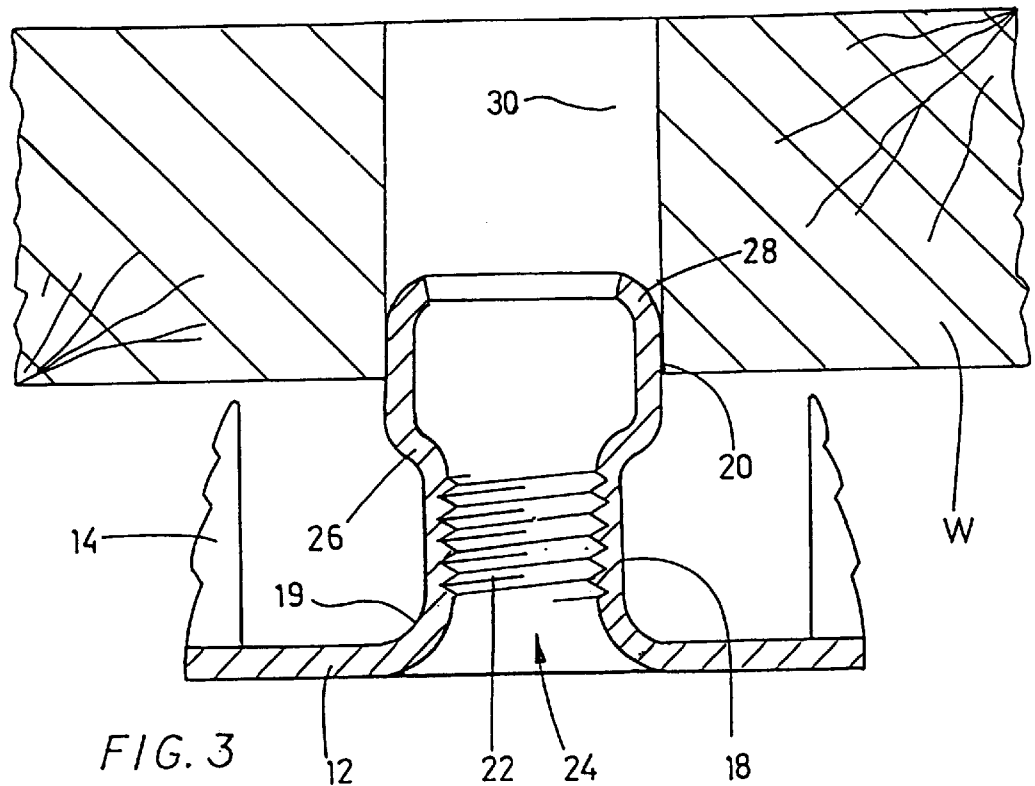
FIG. 3 is a sectional view showing a Tee-nut being inserted into a pre-drilled through hole of a workpiece.

FIG. 3 shows a Tee-nut partially inserted into a hole 30 in a workpiece. The hole 30 is dimensioned to fit the enlarged sleeve portion 20. The radiussed end 28 prevents the portion 20 from catching or tearing the wood. The trumpet shaped radius 19 locates the Tee-nut concentric in the hole 30.

Figure 4:
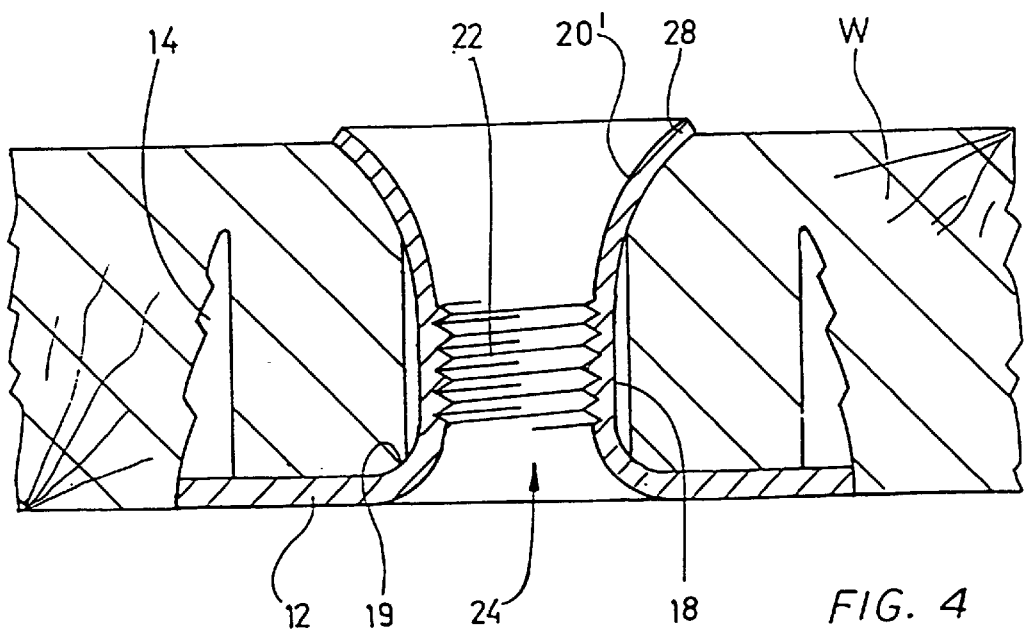
FIG. 4 is a section corresponding to FIG. 3 showing the Tee-nut completely inserted, and flared out.

FIG. 4 shows a Tee-nut 10 after having been inserted into a pre-drilled through hole 30 of a workpiece W, such as a piece of wood, or a panel of chipboard, or other composite material. The diameter of the through hole 30 corresponds to the outer diameter of the enlarged portion 20 of the Tee-nut 10. The prongs 14—14 penetrate the workpiece W and prevent rotation of the Tee-nut 10 when a threaded screw member is being threadingly engaged to the internal threaded portion 18.

The enlarged portion 20 extends just through the hole 30 and is then flared out by means of a conventional flaring tool (not shown), forming a trumpet-shaped flared end 20'. The flared end 20' securely holds the Tee-nut 10 within the pre-drilled through hole 30 of the workpiece 10 and prevents the Tee-nut 10 from being withdrawn or pulled out from the workpiece W. The trumpet shaped radius 19 serves to centre the threaded barrel portion 18 in the through hole 30.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A Tee-nut with a flareable portion for insertion into a wooden workpiece and comprising:

a flange head member;

a plurality of prongs extending from said flange head member; and a cylindrical sleeve member extending from said flange head member;

said sleeve member, being in the form of a hollow cylindrical barrel, comprising:

an internally threaded cylindrical sleeve portion provided at one end of said sleeve member connecting to said flange head member said sleeve member defining a predetermined internal diameter D1;

an enlarged cylindrical flareable portion extending from said internally threaded sleeve portion and provided at a free end of said sleeve member, said flareable portion having inside and outside surfaces, and wherein the outer diameter of said enlarged cylindrical flareable portion is larger than the outer diameter of said sleeve member, and wherein the inner diameter D2 of said enlarged flareable cylindrical portion is larger than the inner diameter D1 of said internally threaded sleeve portion such that a threading tool is adapted to pass through said enlarged flareable cylindrical portion and internally threading said one end of said cylindrical sleeve portion thus forming internal threads in said sleeve portion; and, an inwardly radiussed end on said enlarged cylindrical flareable portion said inwardly radiussed end having inside and outside surfaces, both said surfaces being inwardly radiussed as aforesaid and being formed around said radius of said end and defining an end opening having a predetermined diameter D3, wherein D3 is less than D2 and is greater than D1, whereby said threading tool can pass through said end opening and enter said sleeve for internally threading said sleeve as aforesaid, and whereby entry of said enlarged flareable portion into said workpiece is facilitated by said inward radiussing.

2. A Tee-nut as claimed in claim 1 further comprising an outwardly extending portion connecting between said internally threaded portion and said enlarged flarable portion, and tapering towards said internally threaded portion, said outwardly extending portion being adapted to be bent outwardly when said enlarged flarable portion is being flared out.

3. A Tee-nut as claimed in claim 1 including a trumpet-shaped radius at the transition between the flange head member and the internally threaded sleeve portion to assist in centering the Tee-nut in a hole in the workpiece.

4. A wooden workpiece having a Tee nut secured therein and comprising;

at least one hole extending through said work piece said hole having a predetermined diameter; and a Tee-nut with a flareable portion located in said hole and comprising:

a flange head member;

a plurality of prongs extending from said flange head member, and into said work piece; and a cylindrical sleeve member extending from said flange head member;

said sleeve member, being in the form of a hollow cylindrical barrel, comprising:

an internally threaded cylindrical sleeve portion having an internal diameter D1 provided at one end of said sleeve member connecting to said flange head member;

an enlarged cylindrical flareable sleeve portion having an internal diameter D2 extending from said internally threaded sleeve portion and provided at a free end of said sleeve member, and having inside and outer surfaces wherein the outer diameter of said enlarged cylindrical flareable portion is larger than the outer diameter of said internally threaded sleeve portion, and wherein the inner diameter D2 of said enlarged flareable cylindrical portion is larger than the inner diameter D1 of said internally threaded sleeve portion such that a threading tool is adapted to pass through said enlarged flareable cylindrical portion and internally threading said one end of said cylindrical sleeve member forming said internally threaded sleeve portion; and, an inwardly radiussed end on said enlarged cylindrical flareable portion said inwardly radiussed end having inside and outside surfaces, both said surfaces being inwardly radiussed as aforesaid and being formed around said radius of said end defining an end opening having a predetermined diameter D3, wherein D3 is less than D2 and is greater than D1, whereby said threading tool can pass through said end opening and enter said sleeve for internally threading said sleeve as aforesaid, and whereby entry of said enlarged flareable portion into said workpiece is facilitated by said inward radiussing.

5. A wooden workpiece and as claimed in claim 4 and including, an outwardly extending portion connecting between said internally threaded portion and said enlarged flarable portion, and tapering towards said internally threaded portion, said outwardly extending portion being adapted to be bent outwardly when said enlarged flarable portion is being flared out.

6. A wooden workpiece as claimed in claim 5 and including;

a trumpet-shaped radius at the transition between the flange head member and the internally threaded sleeve portion to assist in centering the Tee-nut in a hole in the workpiece.

7. A wooden workpiece as claimed in claim 6 wherein said hole has a diameter sized to receive said enlarged cylindrical flarable sleeve portion, and said free end of said enlarged sleeve portion being swaged outwardly thereby securing said Tee-nut in said hole.

* * * * *